US007014126B2

United States Patent
(12) Boertje et al.

(10) Patent No.: US 7,014,126 B2
(45) Date of Patent: Mar. 21, 2006

(54) SORTING MACHINE FOR DIVERTING AN ARTICLE FROM AN ARTICLE STREAM

(75) Inventors: Marcus Boertje, Port Washington, NY (US); Michael Foy, Baldwin, NY (US)

(73) Assignee: Festo Corporation, Hauppauge, NY (US)

(*) Notice: Subject to any disclaimer, the term of this patent is extended or adjusted under 35 U.S.C. 154(b) by 44 days.

(21) Appl. No.: 10/802,192

(22) Filed: Mar. 17, 2004

(65) Prior Publication Data

US 2005/0205472 A1 Sep. 22, 2005

(51) Int. Cl.
*A01G 25/02* (2006.01)
*R05B 1/20* (2006.01)
*A62B 18/00* (2006.01)

(52) U.S. Cl. ...................... 239/266; 239/267; 239/270; 239/124; 239/569

(58) Field of Classification Search ................ 239/266, 239/267, 270, 124, 569; 209/549, 563, 577, 209/582, 587
See application file for complete search history.

(56) References Cited

U.S. PATENT DOCUMENTS 3,097,161 A 7/1963 Dudyak
3,097,744 A 7/1963 Hutter et al.
3,931,892 A 1/1976 Sklena et al.
4,002,560 A * 1/1977 Grantham ................... 209/563
4,095,625 A 6/1978 Marpe
4,225,089 A 9/1980 Stone
4,314,645 A 2/1982 Perkins, III et al.
4,569,512 A * 2/1986 Bergerioux et al. ......... 271/103
4,889,241 A 12/1989 Cogan et al.
5,339,964 A 8/1994 Gray et al.
5,339,965 A 8/1994 Klukis et al.
6,305,551 B1 10/2001 Ruymen

* cited by examiner

*Primary Examiner*—Davis Hwu
(74) *Attorney, Agent, or Firm*—Hoffmann & Baron, LLP

(57) ABSTRACT

A sorting machine for diverting an article from an article stream generally includes a manifold, a first valve supported on the manifold and a second valve supported on top of the first valve. The manifold has a first blow-off conduit and a second blow-off conduit formed therein. The first blow-off conduit terminates at a first blow-off port and the second blow-off conduit terminates at a second blow-off port. The first valve is in fluid communication with the first blow-off conduit of the manifold for supplying a burst of fluid out of the manifold through the first blow-off port to divert an article from an article stream intersecting with the first blow-off port. The first valve further has a by-pass duct in fluid communication with the second blow-off conduit of the manifold. The second valve is in fluid communication with the by-pass duct of the first valve for supplying a burst of fluid out of the manifold through the second blow-off port to divert an article from an article stream intersecting with said second blow-off port. In this manner, the space between the first and second blow-off ports of the manifold can be made less than the width of the first valve.

36 Claims, 5 Drawing Sheets

SORTING MACHINE FOR DIVERTING AN ARTICLE FROM AN ARTICLE STREAM

FIELD OF THE INVENTION

The present invention relates generally to sorting machines used in high speed manufacturing systems, and more particularly to a sorting machine, for diverting an article from an article stream, having a compact manifold and stackable valves for minimizing space requirements.

BACKGROUND OF THE INVENTION

Present day pneumatic sorting machines are used in various manufacturing and other applications for sorting various objects or articles. FIG. 1 of the Drawings illustrates a conventional sorting machine 100 of the prior art. Typically, the objects or articles 102 to be sorted are identified by a vision system 104, although other identifying means may be used. The vision system 104 is typically electrically connected to a mechanism of accepting or rejecting the identified goods or articles 102 located downstream of the vision system. Generally, the vision system 104 sends some form of signal to the sorting mechanism to either accept or reject a particular good.

Many sorting mechanisms to accept or reject the articles are known. One such known mechanism involves a plurality of pneumatic valves 106 arranged to provide an air stream ("blow-off") that will blow away an accepted or rejected article 102. Specifically, upon receiving a signal from the vision system 104, a pneumatic valve 106 will supply a short burst of air directed out a blow-off port 108 to divert an accepted or rejected good 102*a* from its normal path of travel 110 to a collection station 112 for the accepted or rejected articles.

Usually, such sorting machines include multiple pneumatic valves installed in "banks" and commonly connected via a manifold 114 or via a multiple of single sub-bases connected together. The manifold 114 generally has internal conduits 116 formed therein to provide fluid communication between each pneumatic valve 106 and an associated blow-off port 108. Thus, each pneumatic valve 106 is typically mechanically fastened or otherwise secured to the manifold 114 adjacent its associated blow-off port 108 whereby some form of outlet 118 provided in the valve is provided to be in fluid communication with an associated manifold conduit 116. One or more seals (not shown) are usually provided to ensure an air-tight connection between the valve 106 and the manifold 114.

In most sorting applications, a large amount of articles must be sorted in a relatively short time. For economic reasons, it is preferred to sort articles in the smallest amount of time possible. The allotted time-frame thus requires a very precise time controlled air blow-off by the valve 106. To control the timing of the blow-off, it is desired to have the flow path for each separate blow-off port 108 be the same in size and shape. Additionally, another objective of the sorting equipment is to accurately sort the article or good within a minimum amount of space. Hence, when more articles can be sorted in a smaller allotted space, one will save time.

However, in most sorting applications, the pneumatic valve 106 is much larger than the goods or articles to be sorted (e.g., rice sorting). Thus, the spacing of blow-off ports 108 is severely limited by the size of the pneumatic valves. In particular, the distance between the air stream paths is limited to one valve width apart. Because the spacing between each blow-off port 108 is far apart, due to the valve sizes, the sorting machine becomes inherently large.

To limit the size of the sorting machine, often less valves are used while the blow-off ports are enlarged. This, however, creates a larger than necessary air stream to divert accepted or rejected articles from their flow path. While this reduces the size of the sorting machine, it may result in diverted goods or articles which should not be diverted.

Accordingly, it would be desirable to provide a sorting machine having a compact manifold adapted to support a bank of valves for sorting goods or articles one at a time, wherein the distance between the blow-off ports is less than a valve width apart.

SUMMARY OF THE INVENTION

The present invention is a sorting machine for diverting an article from an article stream. The sorting machine generally includes a manifold, a first valve supported on the manifold, a second valve supported on top of the first valve and a by-pass duct for permitting fluid communication between the second valve and the manifold. The manifold has a first blow-off conduit and a second blow-off conduit formed therein. The first blow-off conduit terminates at a first blow-off port and the second blow-off conduit terminates at a second blow-off port. The first valve is in fluid communication with the first blow-off conduit of the manifold for supplying a burst of fluid out of the manifold through the first blow-off port to divert an article from an article stream intersecting with the first blow-off port. The by-pass duct may be provided as part of the first valve and is in fluid communication with the second blow-off conduit of the manifold. The second valve is in fluid communication with the by-pass duct for supplying a burst of fluid out of the manifold through the second blow-off port to divert an article from an article stream intersecting with said second blow-off port. In this manner, the space between the first and second blow-off ports of the manifold can be made less than the width of the first valve.

In a preferred embodiment, the first and second valves are pneumatic valves and the fluid is air. Additionally, the manifold further preferably includes a fluid supply line formed therein for supplying a fluid, e.g., air, to the first and second valves. Thus, the first valve preferably includes a fluid supply duct in fluid communication with the fluid supply line formed in the manifold, whereby the fluid supply duct supplies fluid to the first and second valves.

The first and second valves may include actuators electrically connected to a vision system. The actuators receive a signal from the vision system for selectively activating the valves to respectively supply bursts of fluid out of the manifold through the blow-off ports.

The first and second blow-off conduits of the manifold each preferably include a valve connection interface opposite the first and second blow-off ports for fluidly connecting the first valve to the first and second blow-off conduits and the valve connection interfaces are provided with seals to prevent fluid leakage. Also, the by-pass duct of the first valve is preferably disposed within the first valve and extends from a bottom surface of the first valve to a top surface of the first valve. Thus, the second valve is supported on the top surface of the first valve and communicates with the by-pass duct disposed inside the first valve. In a preferred embodiment, the first and second blow-off ports are disposed on a first face of the manifold and the first valve is supported on a second face of the manifold.

The first valve further preferably includes a blow-off duct in fluid communication with the first blow-off conduit of the manifold and the second valve further includes a blow-off duct in fluid communication with the by-pass duct of the first valve. The blow-off ducts of the first and second valves can then be sized and shaped to accommodate for the height difference between the first and second valves.

The manifold may further include a third blow-off conduit formed therein and the sorting machine may include a third valve. The third blow-off conduit terminates at a third blow-off port disposed on the first face of said manifold and the third valve is in fluid communication with the third blow-off conduit of the manifold for supplying a burst of air out of the manifold through the third blow-off port to divert an article from an article stream intersecting with the third blow-off port. The third valve may be further stacked upon the second valve or the third valve may be supported on a third face of the manifold.

When the third valve is further stacked on the second valve, the first valve further includes a second by-pass duct in fluid communication with the third blow-off conduit of the manifold and the second valve further includes a by-pass duct in fluid communication with the second by-pass duct of the first valve. The third valve is supported on top of the second valve and is in fluid communication with the by-pass duct of the second valve for supplying a burst of fluid out of the manifold through the third blow-off port.

When the third valve is supported on a third face of the manifold, the manifold may further include a fourth blow-off conduit formed therein and a fourth valve may be stacked upon the third valve. In this embodiment, the fourth blow-off conduit terminates at a fourth blow-off port disposed on the first face of the manifold and the third valve includes a by-pass duct in fluid communication with the fourth blow-off conduit of the manifold. The fourth valve is supported on top of the third valve and is in fluid communication with the by-pass duct of the third valve for supplying a burst of fluid out of the manifold through the fourth blow-off port to divert an article from an article stream intersecting with the fourth blow-off port. In this manner, the first, second, third and fourth blow-off ports of the manifold can be sequentially aligned, whereby the space between the first and the fourth blow-off ports being can be made less than the width of the first valve plus the width of the third valve. The result is a very compact manifold.

The present invention further involves a method for decreasing the space between a first article stream intersecting a first blow-off port of a sorting machine and a second article stream intersecting a second blow-off port of the sorting machine. The method generally includes the steps of supporting a first valve on a top surface of a manifold having the first and second blow-off ports formed therein and supporting a second valve on either the top of the first valve or a bottom surface of the manifold. The first valve is in fluid communication with the first blow-off port for supplying a burst of fluid out of the first blow-off port to divert an article from the first article stream. The second valve is in fluid communication with the second blow-off port for supplying a burst of fluid out of the second blow-off port to divert an article from the second article stream. In this manner, the space between the first and second article streams can be made less than the width of the first valve.

When the second valve is supported on top of the first valve, the method may further include the step of supporting a third valve on top of the second valve. The third valve is in fluid communication with a third blow-off port formed in the manifold for supplying a burst of fluid out of the third blow-off port to divert an article from a third article stream intersecting the third blow-off port. Again, in this manner the space between the first, second and third article streams can be made less than the width of the first valve.

A preferred form of the sorting machine, as well as other embodiments, objects, features and advantages of this invention, will be apparent from the following detailed description of illustrative embodiments thereof, which is to be read in conjunction with the accompanying drawings.

DETAILED DESCRIPTION OF ILLUSTRATIVE EMBODIMENTS

Figure 1:
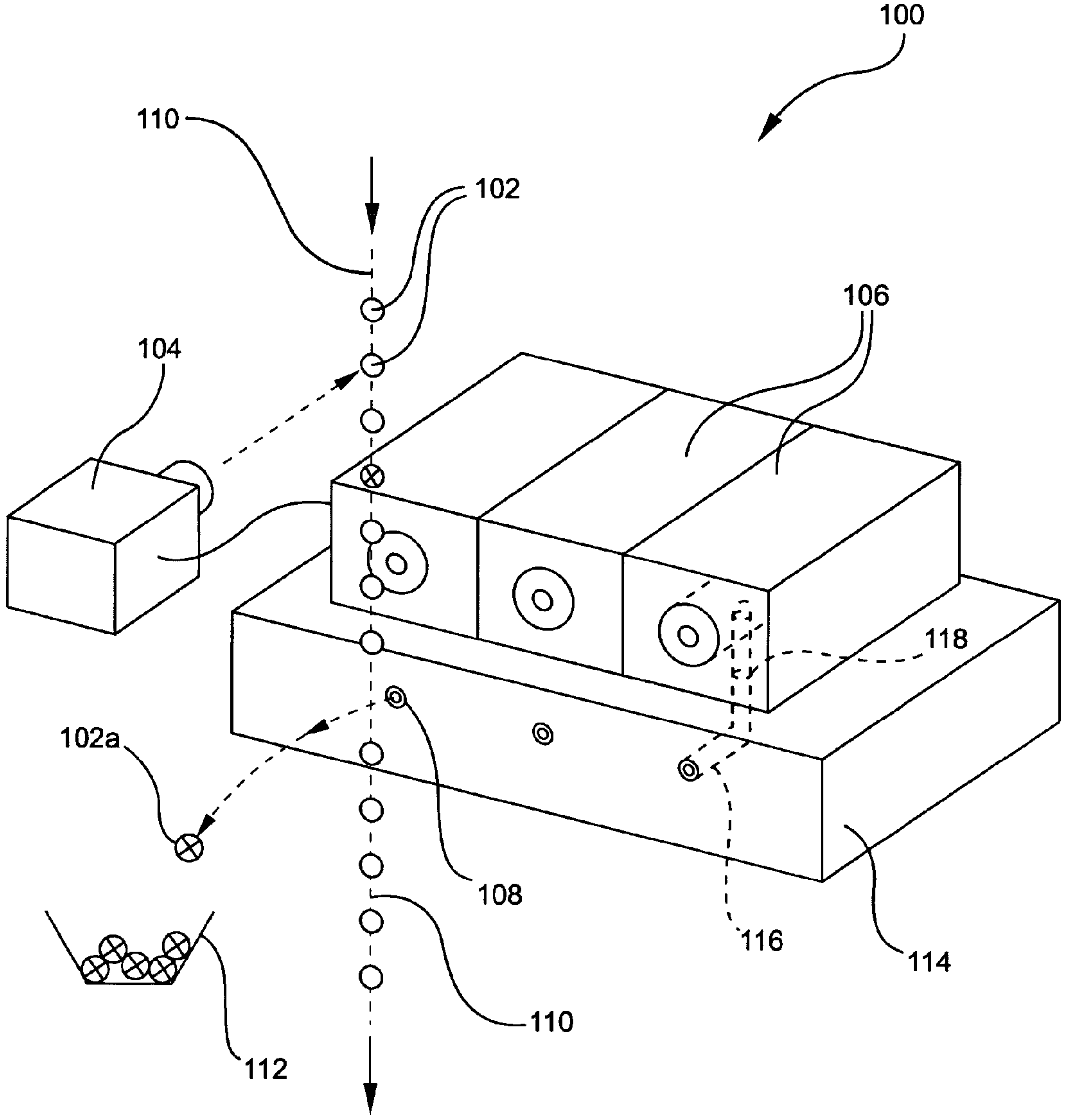
FIG. 1 Prior Art
FIG. 1 is a perspective view of a conventional sorting machine of the prior art.

Referring now to FIGS. 2–5, a sorting machine or system 10 formed in accordance with the present invention is shown. In certain respects, the sorting system 10 of the present invention is similar to the prior art system described with reference to FIG. 1. In particular, the objects or articles 12 to be sorted travel in a path 14 that intersects with a blow-off port 16 formed in a front face 17 of a manifold 18. The objects 12 may be identified by a vision system (see FIG. 1) electrically connected to an arrangement of valves, which receive a signal from the vision system for accepting or rejecting the identified goods 12 downstream of the vision system. As described above, a valve receiving a signal from the vision system will supply a short burst of fluid 20 directed out from the blow-off port 16 of the manifold 18 to divert an accepted or rejected good 22 from its normal path of travel 14 to a collection station 24 for the accepted or rejected articles. The system 10 described herein is a pneumatic system utilizing pneumatic valves, however, it is conceivable that the system according to the present invention can be any fluid operated system.

Unlike the conventional sorting machine described above, the sorting system 10 of the present invention includes a manifold 18 specially designed to support a stack of at least two pneumatic valves 26 and 28 arranged one on top of the other. In a preferred embodiment, the manifold 18 is further designed to support stackable pneumatic valve arrangements both on a top surface 30 and a bottom surface 32. The valves 26 and 28 may be secured to the manifold and to each other in a conventional manner, such as by threaded fasteners, and include electrical contacts 34 for electrical connection to, for example, a vision system for activating the valve.

The manifold 18 of the present invention includes a plurality of internal conduits formed therein. Preferably, extending along the length of the manifold 18, perpendicular to the blow-off ports 16, is a common fluid supply line 36 having transverse branches 38*a* and 38*b*, which fluidly connect the supply line to supply line ports 40*a* and 40*b* formed, respectively, on the top surface 30 and the bottom surface 32 of the manifold. To keep manifold dimensions to a minimum, the air supply for each valve stack is preferably shared. However, individual working fluid supply lines may also be provided for each valve.

Figure 3:
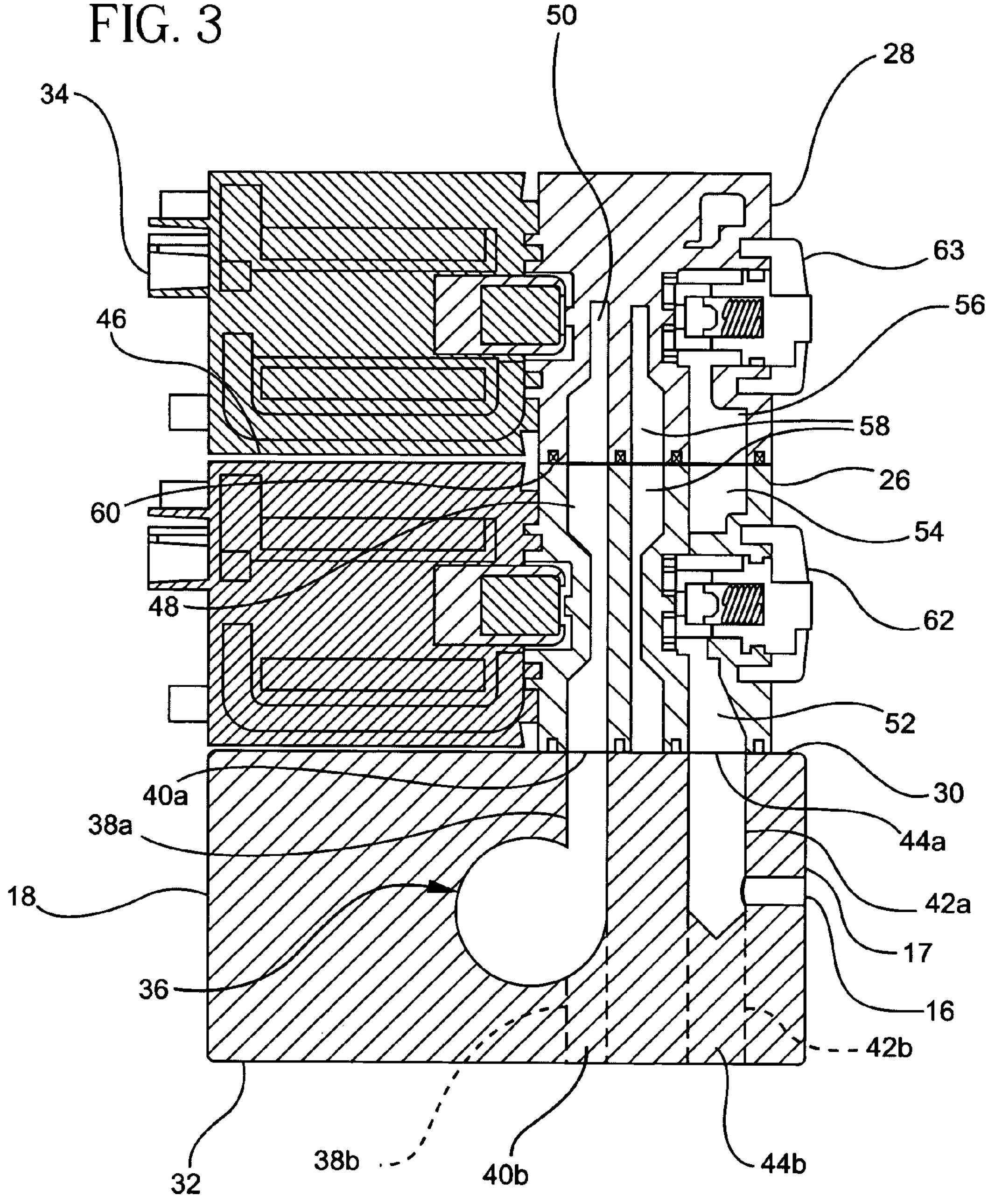
FIG. 3 is a cross-sectional view of the sorting machine shown in FIG. 2 taken along the centerline of one of the valve units.

The manifold 18 further includes blow-off conduits 42*a* and 42*b* formed therein, which fluidly connect the blow-off ports 16 formed on the front face 17 of the manifold to valve connection ports 44*a* and 44*b* formed, respectively, on the top surface 30 and the bottom surface 32 of the manifold. As shown in FIG. 3, the transverse fluid supply branches 38*a* and 38*b*, and the blow-off conduits 42*a* and 42*b* are formed generally perpendicular to the direction of the blow-off ports 16.

As mentioned above, secured to at least the top surface 30 of the manifold 18 is a stack of at least two valves 26 and 28 arranged one on top of the other. A first valve 26 is secured directly to the top surface 30 of the manifold 18 and a second valve 28 is secured to a top surface 46 of the first valve. The first valve 26 includes a fluid supply duct 48 formed therein for supplying the working fluid, e.g., air, from the manifold 18 to the first valve. Thus, the fluid supply duct 48 of the first valve 26 communicates with the supply line port 40*a* of the manifold 18 when the first valve is secured thereto. However, the fluid supply duct 48 of the first valve 26 extends entirely through the first valve and terminates at the top surface 46 of the first valve so as to further provide the working fluid to the second valve 28 secured to the top surface of the first valve. In this manner, the second valve 28 includes a fluid supply duct 50 formed therein for supplying the working fluid from the manifold 18 to the second valve. The fluid supply duct 50 of the second valve 28 communicates with the fluid supply duct 48 of the first valve 26 when the second valve is secured to the first valve. This arrangement can be repeated to supply working fluid to a third valve stacked on top of the second valve and so on.

The first valve 26 further includes a blow-off duct 52 formed therein for supplying a burst of working fluid to an associated blow-off port 16. Thus, the blow-off duct 52 of the first valve 26 communicates with an associated valve connection port 44$a_1$ of the manifold 18 when the first valve is secured thereto. The first valve 26, however, further includes a by-pass duct 54 which extends entirely through the first valve and terminates at the top surface 46 of the first valve so as to communicate with a blow-off duct 56 formed in the second valve 28 secured to the top surface of the first valve. The by-pass duct 54 of the first valve 26 communicates with an associated valve connection port 44$a_2$ of the manifold 18 when the first valve is secured thereto. The first and second valves may be provided with one or more additional by-pass ducts 58 to accommodate additional valves stacked on the second valve and so on. Additionally, all flow fluid interfaces between the valves and between the first valve and the manifold are preferably separated by a fluid-tight seal 60 commonly used in the art to prevent fluid leakage.

In operation, upon receiving a signal from, for example, a vision system, an actuator 62 of the first valve 26 operates to provide a burst of blow-off fluid through the blow-off duct 52 of the first valve. The actuator 62 may be electrically connected to the vision system via the electrical contacts 34 provided at the rear of the valves.

The blow-off fluid travels from the blow-off duct 52 of the first valve 26 through an associated blow-off valve connection port 44$a_1$ and into the associated blow-off conduit 42$a_1$ formed in the manifold 18 where it exits the manifold from a blow-off port 16$a_1$. Similarly, upon receiving a signal, an actuator 63 of the second valve 28 operates to provide a burst of blow-off fluid through the blow-off duct 56 of the second valve. A burst of blow-off fluid supplied by the second valve 28 will travel through the blow-off duct 56 of the second valve and into the by-pass duct 54 of the first valve 26. From there the fluid travels through an associated blow-off valve connection port 44$a_2$ and into the associated blow-off conduit 42$a_2$ formed in the manifold 18 where it exits the manifold from a blow-off port 16$a_2$.

In practice, any volume differences between the upper valve blow-off duct path and the lower valve blow-off duct path due to the height position difference between the two will be negligible when looking at the time difference of the fluid stream coming out of the respective ducts. However, if so desired, one can change the air stream shape, size and speed by changing the blow-off duct path shape and size. In any event, it has been found that the valve switching speed is generally the limiting factor for the blow off of articles or goods.

Figure 2:
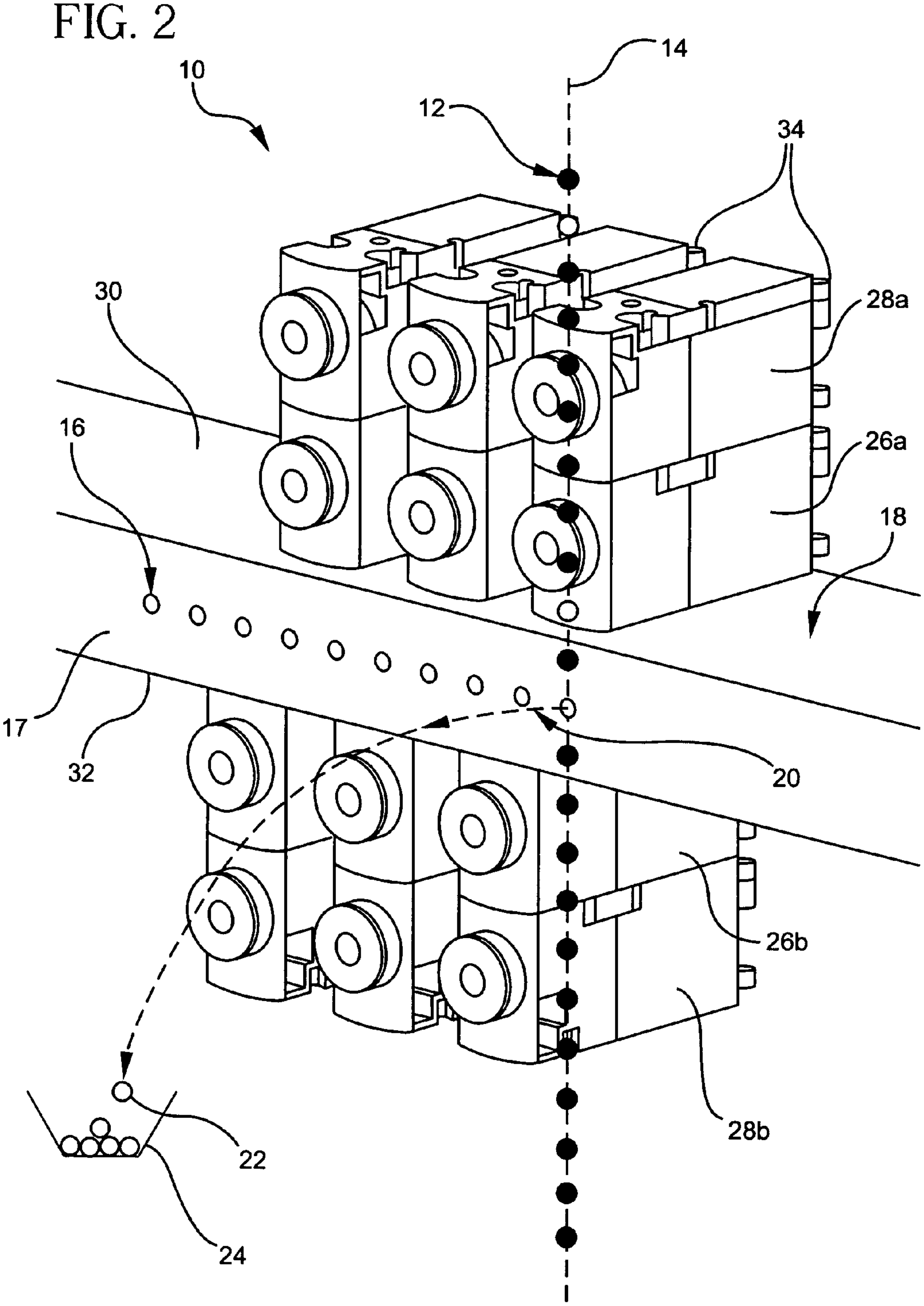
FIG. 2 is a perspective view of a sorting machine formed in accordance with the present invention.
Figure 4:
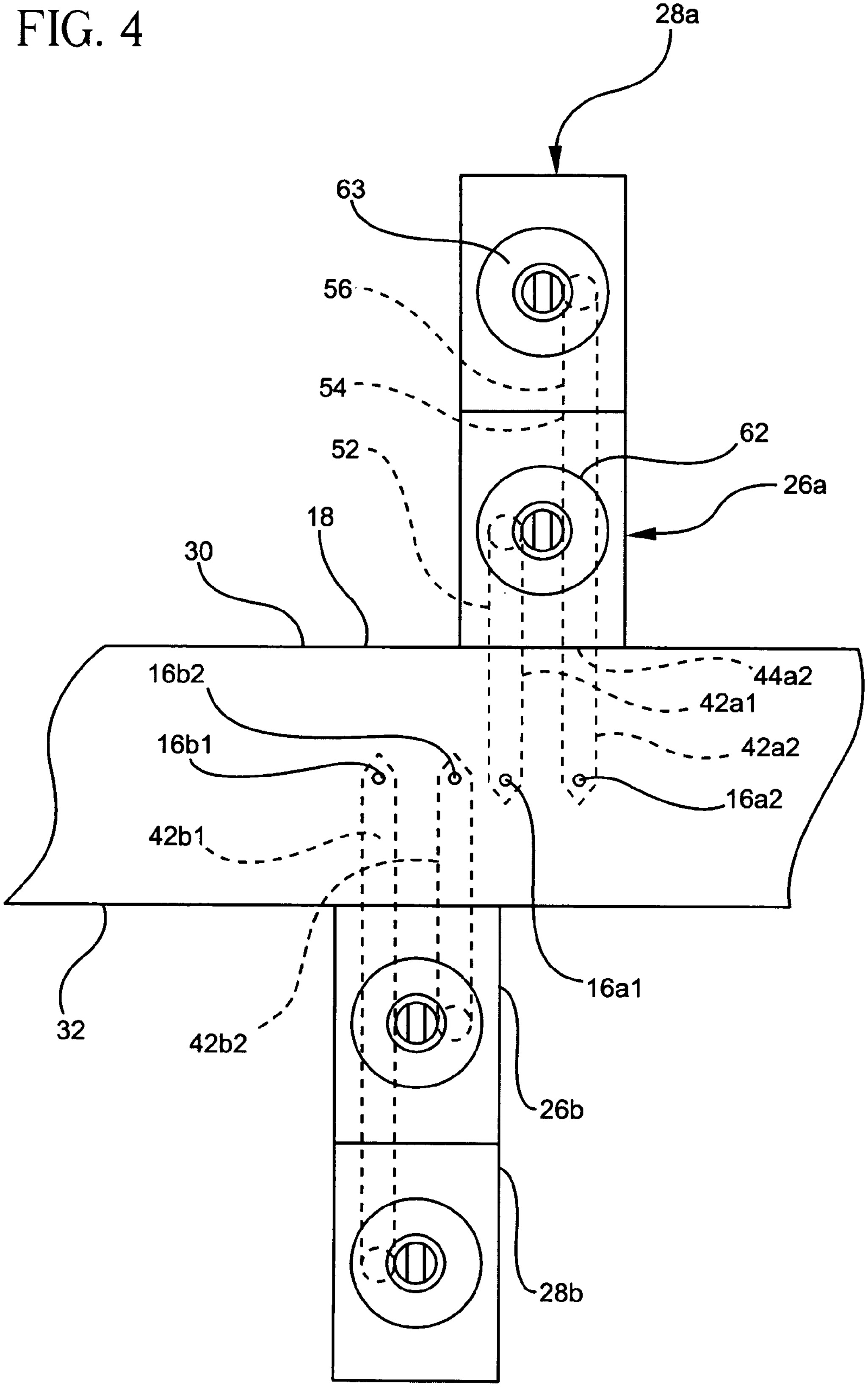
FIG. 4 is a front plan view of the sorting machine shown in FIG. 3.
Figure 5:
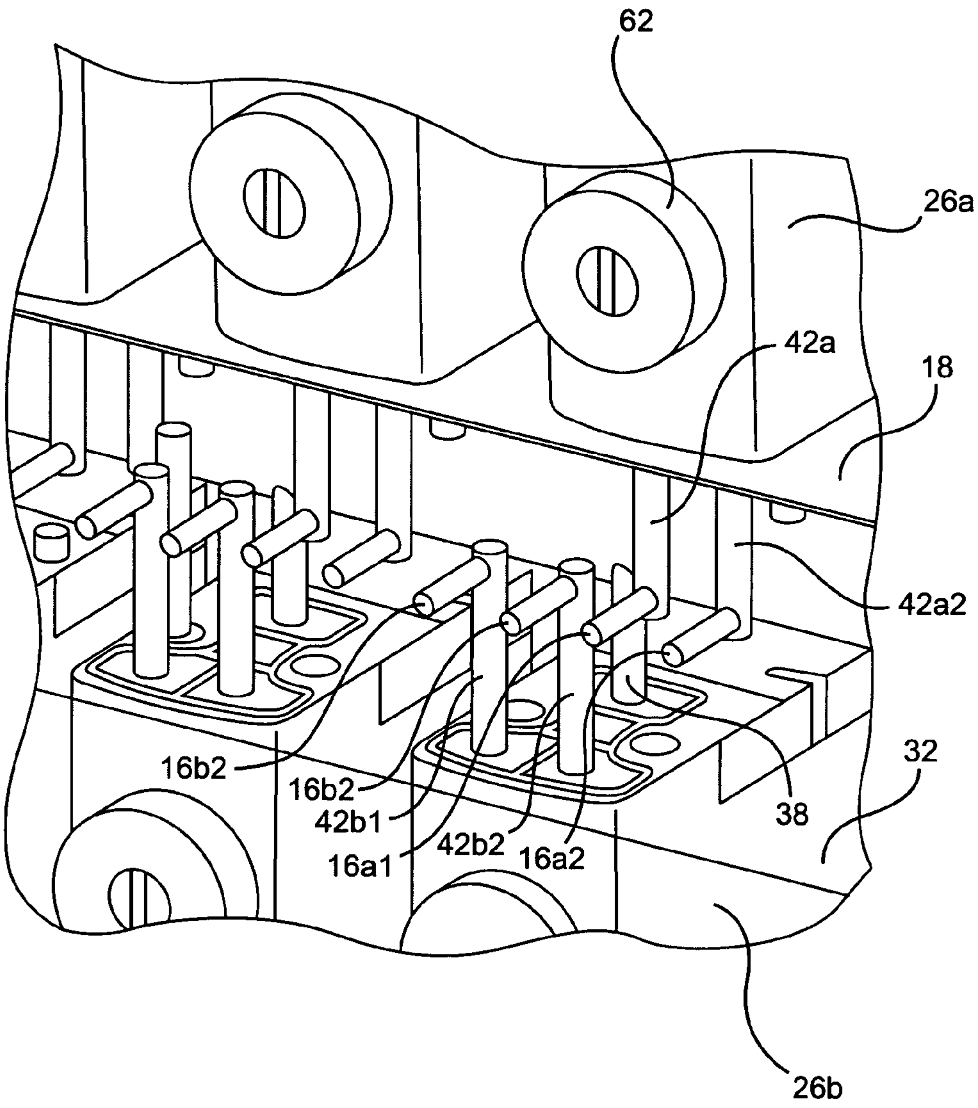
FIG. 5 is an enlarged and more detailed perspective view of the sorting machine shown in FIG. 2, with the front face of the manifold removed.

The compact arrangement that can be achieved with the present invention is best illustrated in FIGS. 2, 4 and 5. By stacking valves in the above manner, the spacing between the blow-off ports can be dramatically reduced. Specifically, instead of one blow-off port being allotted per each valve width, two or more blow-off ports can be provided. Additionally, by arranging stacks of valves on both the top surface 30 and the bottom surface 32, additional blow-off ports can be provided with reduced space requirements. In particular, a blow-off port 16$a_1$ and its associated blow-off conduit 44$a_1$ connected to a first valve 26*a* secured to the top surface 30 of the manifold 18 can be positioned in close proximity to a blow-off port 16$a_2$ and its associated blow-off conduit 44$a_2$ connected to a second valve 28*a* secured to the top surface of the manifold. Moreover, the blow-off ports 16$a_1$ and 16$a_2$ for the valves 26*a* and 28*a* on the top surface 30 of the manifold 18 can be positioned in close proximity to blow-off ports 16$b_1$ and 16$b_2$ for valves 26*b* and 28*b* on the bottom surface 32 of the manifold. As a result, with a two valve stack arrangement on both the top and bottom surfaces of the manifold, four blow-off ports can be provided in a spacing that is less than two valve widths.

As a result of the present invention, the above-identified needs in the art are met by providing stackable valves located on a manifold in such a way that it can provide a minimum distance between air blow off paths while still being able to accurately sort goods or articles without diverting the wrong article or good.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A sorting machine for diverting an article from an article stream, the sorting machine comprising:

a manifold having a first blow-off conduit and a second blow-off conduit formed therein, said first blow-off conduit terminating at a first blow-off port and said second blow-off conduit terminating at a second blow-off port;

a first valve supported on said manifold, said first valve being in fluid communication with said first blow-off conduit of said manifold for supplying a burst of fluid out of said manifold through said first blow-off port to divert an article from an article stream intersecting with said first blow-off port, said first valve further having a by-pass duct in fluid communication with said second blow-off conduit of said manifold; and a second valve supported on top of said first valve, said second valve being in fluid communication with said by-pass duct of said first valve for supplying a burst of fluid out of said manifold through said second blow-off port to divert an article from an article stream intersecting with said second blow-off port.

2. A sorting machine as defined in claim 1, wherein said first and second valves are pneumatic valves and said fluid is air.

3. A sorting machine as defined in claim 1, wherein the space between said first and second blow-off ports of said manifold is less than the width of said first valve.

4. A sorting machine as defined in claim 1, wherein said manifold further includes a fluid supply line formed therein for supplying a fluid to said first and second valves.

5. A sorting machine as defined in claim 4, wherein said first valve includes a fluid supply duct in fluid communication with said fluid supply line formed in said manifold, said fluid supply duct supplying fluid to said first and second valves.

6. A sorting machine as defined in claim 1, wherein said first and second valves include actuators electrically connected to a vision system, said actuators receiving a signal from said vision system for selectively activating said valves to respectively supply said bursts of fluid out of said manifold through said first and second blow-off ports.

7. A sorting machine as defined in claim 1, wherein said first and second blow-off conduits of said manifold each include a valve connection interface opposite said first and second blow-off ports for fluidly connecting said first valve to said first and second blow-off conduits, said valve connection interfaces being provided with seals to prevent fluid leakage.

8. A sorting machine as defined in claim 1, wherein said by-pass duct of said first valve is disposed within said first valve and extends from a bottom surface of said first valve to a top surface of said first valve, said second valve being supported on said top surface of said first valve.

9. A sorting machine as defined in claim 1, wherein said first valve further includes a blow-off duct in fluid communication with said first blow-off conduit of said manifold and said second valve further includes a blow-off duct in fluid communication with said by-pass duct of said first valve, said blow-off ducts of said first and second valves being sized and shaped to accommodate for the height difference between said first and second valves.

10. A sorting machine as defined in claim 1, wherein said first and second blow-off ports are disposed on a first face of said manifold and said first valve is supported on a second face of said manifold.

11. A sorting machine as defined in claim 10, wherein said manifold further includes a third blow-off conduit formed therein, said third blow-off conduit terminating at a third blow-off port disposed on said first face of said manifold, and wherein said sorting machine further includes a third valve in fluid communication with said third blow-off conduit of said manifold for supplying a burst of air out of said manifold through said third blow-off port to divert an article from an article stream intersecting with said third blow-off port.

12. A sorting machine as defined in claim 11, wherein said first valve includes a second by-pass duct in fluid communication with said third blow-off conduit of said manifold, and wherein said second valve includes a by-pass duct in fluid communication with said second by-pass duct of said first valve, said third valve being supported on top of said second valve and being in fluid communication with said by-pass duct of said second valve for supplying a burst of fluid out of said manifold through said third blow-off port.

13. A sorting machine as defined in claim 11, wherein said third valve is supported on a third face of said manifold.

14. A sorting machine as defined in claim 13, wherein said manifold further includes a fourth blow-off conduit formed therein, said fourth blow-off conduit terminating at a fourth blow-off port disposed on said first face of said manifold, and wherein said third valve includes a by-pass duct in fluid communication with said fourth blow-off conduit of said manifold, and wherein said sorting machine further includes a fourth valve supported on top of said third valve, said fourth valve being in fluid communication with said by-pass duct of said third valve for supplying a burst of fluid out of said manifold through said fourth blow-off port to divert an article from an article stream intersecting with said fourth blow-off port.

15. A sorting machine as defined in claim 14, wherein said first, second, third and fourth blow-off ports of said manifold are sequentially aligned, the space between the first and the fourth blow-off ports being less than the width of said first valve plus the width of said third valve.

16. A sorting machine for diverting an article from an article stream, the sorting machine comprising:

a manifold having a first blow-off port and a second blow-off port formed therein and a top surface and a bottom surface;

a first valve supported on said top surface of said manifold, said first valve being in fluid communication with said first blow-off port of said manifold for supplying a burst of fluid out of said first blow-off port to divert an article from an article stream intersecting with said first blow-off port;

a second valve supported on one of a top of said first valve and said bottom surface of said manifold, said second valve being in fluid communication with said second blow-off port of said manifold for supplying a burst of fluid out of said second blow-off port to divert an article from an article stream intersecting with said second blow-off port.

17. A sorting machine as defined in claim 16, wherein said second valve is supported on said top of said first valve and said sorting machine further comprises a by-pass duct for providing fluid communication between said second valve and said second blow-off port of said manifold.

18. A sorting machine as defined in claim 16, wherein the space between said first and second blow-off ports of said manifold is less than the width of said first valve.

19. A sorting machine as defined in claim 16, wherein said manifold further includes a fluid supply line formed therein for supplying a fluid to said first and second valves.

20. A method for decreasing the space between a first article stream intersecting a first blow-off port of a sorting machine and a second article stream intersecting a second blow-off port of said sorting machine, the method comprising the steps of:

supporting a first valve on a top surface of a manifold having said first and second blow-off ports formed therein, said first valve being in fluid communication with said first blow-off port for supplying a burst of fluid out of said first blow-off port to divert an article from said first article stream;

supporting a second valve on one of a top of said first valve and a bottom surface of said manifold, said second valve being in fluid communication with said second blow-off port for supplying a burst of fluid out of said second blow-off port to divert an article from said second article stream, wherein said space between said first and second article streams is less than the width of said first valve.

21. A method as defined in claim 20, wherein said second valve is supported on top of said first valve and the method further comprises the step of supporting a third valve on top of said second valve, said third valve being in fluid communication with a third blow-off port formed in said manifold for supplying a burst of fluid out of said third blow-off port to divert an article from a third article stream intersecting said third blow-off port, wherein the space between said first, second and third article streams is less than the width of said first valve.

22. A stacked valve system for providing independent bursts of fluid comprising:

a manifold having a first conduit and a second conduit formed therein, said first conduit terminating at a first port and said second conduit terminating at a second port;

a first valve supported on said manifold, said first valve being in fluid communication with said first conduit of said manifold for supplying a first burst of fluid out of said manifold through said first port, said first valve further having a by-pass duct in fluid communication with said second conduit of said manifold; and a second valve supported on top of said first valve, said second valve being in fluid communication with said by-pass duct of said first valve for supplying a second burst of fluid out of said manifold through said second port.

23. A stacked valve system as defined in claim 22, wherein the space between said first and second ports of said manifold is less than the width of said first valve.

24. A stacked valve system as defined in claim 22, wherein said manifold further includes a fluid supply line formed therein for supplying a fluid to said first and second valves.

25. A stacked valve system as defined in claim 24, wherein said first valve includes a fluid supply duct in fluid communication with said fluid supply line formed in said manifold, said fluid supply duct supplying fluid to said first and second valves.

26. A stacked valve system as defined in claim 22, wherein said by-pass duct of said first valve is disposed within said first valve and extends from a bottom surface of said first valve to a top surface of said first valve, said second valve being supported on said top surface of said first valve.

27. A stacked valve system as defined in claim 22, wherein said first valve further includes a blow-off duct in fluid communication with said first conduit of said manifold and said second valve further includes a blow-off duct in fluid communication with said by-pass duct of said first valve, said blow-off ducts of said first and second valves being sized and shaped to accommodate for the height difference between said first and second valves.

28. A stacked valve system as defined in claim 22, wherein said first and second ports are disposed on a first face of said manifold and said first valve is supported on a second face of said manifold.

29. A stacked valve system as defined in claim 28, wherein said manifold further includes a third conduit formed therein, said third conduit terminating at a third port disposed on said first face of said manifold, and wherein said stacked valve system further includes a third valve in fluid communication with said third conduit of said manifold for supplying a burst of air out of said manifold through said third port.

30. A stacked valve system as defined in claim 29, wherein said first valve includes a second by-pass duct in fluid communication with said third conduit of said manifold, and wherein said second valve includes a by-pass duct in fluid communication with said second by-pass duct of said first valve, said third valve being supported on top of said second valve and being in fluid communication with said by-pass duct of said second valve for supplying a burst of fluid out of said manifold through said third port.

31. A stacked valve system as defined in claim 29, wherein said third valve is supported on a third face of said manifold.

32. A stacked valve system as defined in claim 31, wherein said manifold further includes a fourth conduit formed therein, said fourth conduit terminating at a fourth port disposed on said first face of said manifold, and wherein said third valve includes a by-pass duct in fluid communication with said fourth conduit of said manifold, and wherein said stacked valve system further includes a fourth valve supported on top of said third valve, said fourth valve being in fluid communication with said by-pass duct of said third valve for supplying a burst of fluid out of said manifold through said fourth port.

33. A stacked valve system as defined in claim 32, wherein said first, second, third and fourth ports of said manifold are sequentially aligned, the space between the first and the fourth blow-off ports being less than the width of said first valve plus the width of said third valve.

34. A stacked valve system for providing independent bursts of fluid comprising:

a manifold having a first blow-off port and a second blow-off port formed therein and a top surface and a bottom surface;

a first valve supported on said top surface of said manifold, said first valve being in fluid communication with said first blow-off port of said manifold for supplying a burst of fluid out of said first blow-off port;

a second valve supported on top of said first valve, said second valve being in fluid communication with said second blow-off port of said manifold for supplying a burst of fluid out of said second blow-off port.

35. A stacked valve system as defined in claim 34, further comprising a by-pass duct for providing fluid communication between said second valve and said second blow-off port of said manifold.

36. A stacked valve system as defined in claim 34, wherein the space between said first and second blow-off ports of said manifold is less than the width of said first valve.

* * * * *